(12) United States Patent
Rudraraju et al.

(10) Patent No.: US 10,880,126 B2
(45) Date of Patent: Dec. 29, 2020

(54) METHOD OF INTEGRATING WIRED AND WIRELESS TANK GAUGING SYSTEMS ON FLEXIBLE COMMON GATEWAY HARDWARE

(71) Applicant: Honeywell International Inc., Morris Plains, NJ (US)

(72) Inventors: Sandeep Rudraraju, Bengaluru (IN); Krishna Praveen Ranjith Kumar, Bangalore (IN); Prasad Samudrala, Bangalore (IN); Vilas Ramdas Ingle, Bangalore (IN); Satish Chandra Madappa, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 15/954,893

(22) Filed: Apr. 17, 2018

(65) Prior Publication Data

US 2019/0319821 A1    Oct. 17, 2019

(51) Int. Cl.
| | |
|---|---|
| *H04L 12/66* | (2006.01) |
| *G06Q 10/08* | (2012.01) |
| *H04L 12/771* | (2013.01) |
| *H04L 12/933* | (2013.01) |
| *H04Q 3/545* | (2006.01) |

(52) U.S. Cl.
CPC .......... *H04L 12/66* (2013.01); *G06Q 10/087* (2013.01); *H04L 45/56* (2013.01); *H04L 49/1523* (2013.01); *H04Q 3/54591* (2013.01); *Y10T 137/86187* (2015.04)

(58) Field of Classification Search
CPC ....... G06Q 10/087; H04L 12/66; H04L 45/56; H04L 49/1523; H04L 67/12; H04Q 3/54591; Y10T 137/86187; G01F 23/284; H04W 4/70
See application file for complete search history.

(56) References Cited

U.S. PATENT DOCUMENTS

| 9,609,524 | B2* | 3/2017 | Pulleti | ............... | H04W 16/18 |
|---|---|---|---|---|---|
| 2005/0225441 | A1* | 10/2005 | Kernan | ............... | H04L 12/66 |
| | | | | | 340/506 |
| 2005/0228509 | A1* | 10/2005 | James | ............... | H04L 12/4625 |
| | | | | | 700/19 |
| 2009/0010203 | A1* | 1/2009 | Pratt, Jr. | ............... | H04L 12/66 |
| | | | | | 370/328 |
| 2009/0010233 | A1* | 1/2009 | Pratt, Jr. | ............... | G01D 21/00 |
| | | | | | 370/338 |
| 2009/0174570 | A1* | 7/2009 | Hagg | ............... | G08C 17/02 |
| | | | | | 340/870.31 |

(Continued)

OTHER PUBLICATIONS

Honeywell Enraf, "Engauge," Product Sheet, EN-09-36-US Rev. 1, Nov. 2014, 4 pages.

(Continued)

*Primary Examiner* — Khaled M Kassim
*Assistant Examiner* — Kai Chang

(57) ABSTRACT

A communication interface apparatus in a tank gauging system. The communication interface includes a memory and a processor couple to the memory. The processor communicates using a control application with a tank inventory system that operates over a serial connection; and communicates using a wireless application with tank gauging equipment that operates over a wireless connection.

5 Claims, 8 Drawing Sheets

(56) References Cited

U.S. PATENT DOCUMENTS

| | | | | |
|---|---|---|---|---|
| 2009/0207770 A1* | 8/2009 | Fayfield | ............ | H04Q 9/00 370/311 |
| 2009/0277374 A1* | 11/2009 | Schie | ............ | B65D 90/50 116/109 |
| 2010/0004763 A1* | 1/2010 | Murakami | ............ | H04L 12/2809 700/83 |
| 2011/0158098 A1* | 6/2011 | Daraiseh | ............ | H04W 40/02 370/235 |
| 2013/0120441 A1* | 5/2013 | McIntyre | ............ | G09G 5/373 345/619 |
| 2014/0370820 A1* | 12/2014 | Pulini | ............ | H04L 43/045 455/67.7 |
| 2015/0050950 A1* | 2/2015 | Alon | ............ | H04W 4/029 455/456.1 |
| 2015/0350921 A1* | 12/2015 | Pulleti | ............ | H04W 16/22 370/254 |
| 2016/0153813 A1* | 6/2016 | Skaug | ............ | G01D 9/005 702/187 |
| 2016/0292632 A1* | 10/2016 | Mashburn | ............ | G06Q 30/0635 |
| 2016/0334259 A1* | 11/2016 | Chadowitz | ............ | G06F 21/44 |
| 2016/0381683 A1* | 12/2016 | Sonnenberg | ............ | H04W 72/0453 370/329 |
| 2017/0108854 A1* | 4/2017 | De Ligt | ............ | G05B 19/41855 |
| 2018/0048619 A1* | 2/2018 | Maluf | ............ | H04L 61/106 |
| 2018/0054850 A1* | 2/2018 | Leonelli | ............ | H04W 4/70 |
| 2019/0056977 A1* | 2/2019 | Wang | ............ | G06F 9/54 |
| 2020/0225655 A1* | 7/2020 | Cella | ............ | G05B 23/0264 |

OTHER PUBLICATIONS

Honeywell Enraf, "Entis Pro Inventory Systems," Brochure, BR-09-06-ENG Rev. 3, May 2015, 8 pages.

Honeywell Enraf, "SmartRadar Flex Line," Product Sheet, EN-15-02-ENG, Aug. 2015, 12 pages.

Honeywell Enraf, "Wireless Field Interface," Brochure, BR-14-22-ENG, Oct. 2014, 4 pages.

Honeywell, Enraf Tank Farm Gateway CIU 888, Product Sheet, BR-14-24-ENG Rev. 1, Nov. 2016, 8 pages.

Honeywell, "ISA100 SmartRadar FlexLine User's Guide," Release 220, 4417657, Feb. 2014, 78 pages.

Honeywell, "OneWireless Wireless Device Manager User's Guide," Release 220, OWDOC-X254-en-220A, Oct. 2013, 198 pages.

* cited by examiner

METHOD OF INTEGRATING WIRED AND WIRELESS TANK GAUGING SYSTEMS ON FLEXIBLE COMMON GATEWAY HARDWARE

TECHNICAL FIELD

This disclosure relates generally to tank farm gauging systems. More specifically, this disclosure relates to a method and apparatus of wired and wireless tank gauging systems on a flexible common gateway hardware.

BACKGROUND

Tank gauging is important for determining the contents of a tank. The accurate reading of the contents of a tank also enhances tank inventory control and tank farm management. Tank gauging can provide accurate readings in difficult applications and can prevent the need for a costly stilling well.

SUMMARY

This disclosure provides a method of integrating wired and wireless tank gauging systems on flexible common gateway hardware.

In a first embodiment, a communication interface (CIU) apparatus in a tank gauging system includes a memory and a processor coupled to the memory. The processor communicate using a control application with a tank inventory system that operates over a serial connection; and communicate using a wireless application with tank gauging equipment that operates over a wireless connection.

In a second embodiment, a tank gauging system includes a tank inventory system, a tank gauging system, and a communication interface apparatus. The tank inventory system monitors an inventory in a tank. The tank gauging equipment measures a level of the inventory in the tank. The communication interface apparatus communicates using a control application with a tank inventory system that operates over a serial connection; and communicates using a wireless application with tank gauging equipment that operates over a wireless connection.

In a third embodiment, a method includes communicating using a control application with a tank inventory system that operates over a serial connection; and communicating using a wireless application with tank gauging equipment that operates over a wireless connection.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Figure 1:
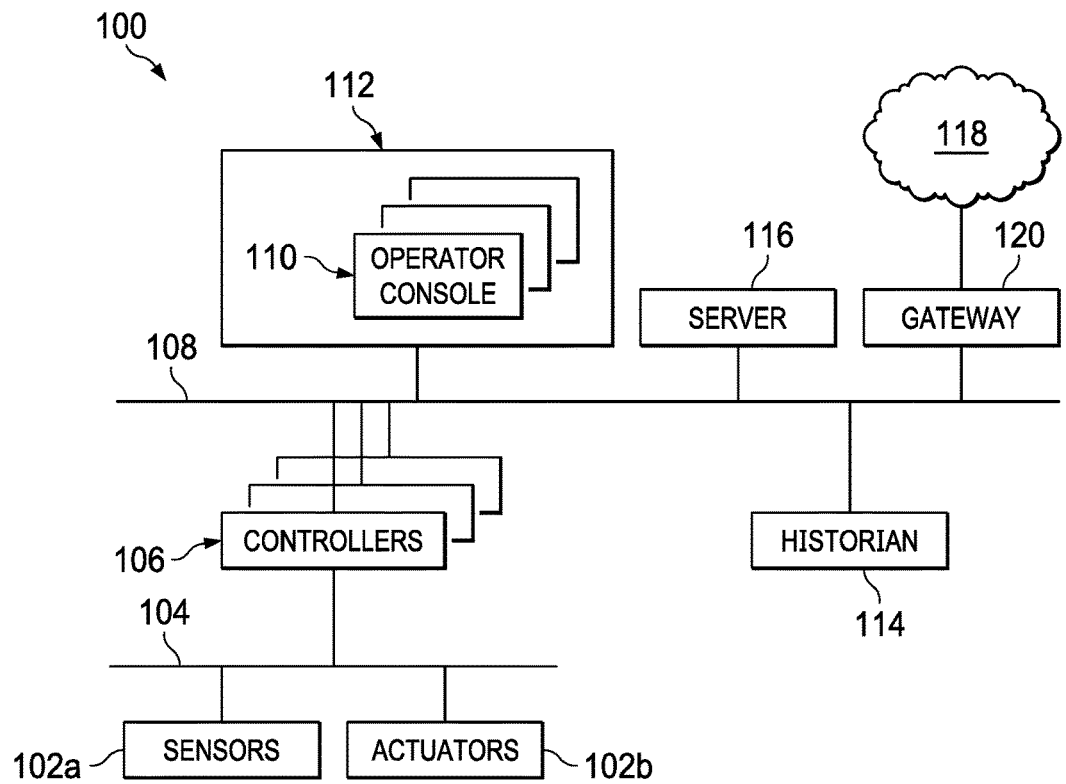
FIG. 1 illustrates an example industrial process control and automation system 100 according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), an electrical signal network (such as a HART network), a pneumatic control signal network, a wireless network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control or other advanced predictive control. As a particular example, each controller 106 could represent a computing device running a real-time operating system, a WINDOWS operating system, or other operating system.

At least one network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

The sensors 102a in FIG. 1 include at least one level meter that captures measurements of material stored in a tank. The sensors 102a can communicate wirelessly with a tank gauging system. The sensor readings are processed and transmitted to a tank inventory system over a serial connection.

Although FIG. 1 illustrates one example of an industrial process control and automation system 100, various changes may be made to FIG. 1. For example, the system 100 could include any number of sensors, actuators, controllers, networks, operator stations, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where at least one flow meter can be monitored. This functionality can be used in any other suitable system, and that system need not be used for industrial process control and automation.

Figure 2:
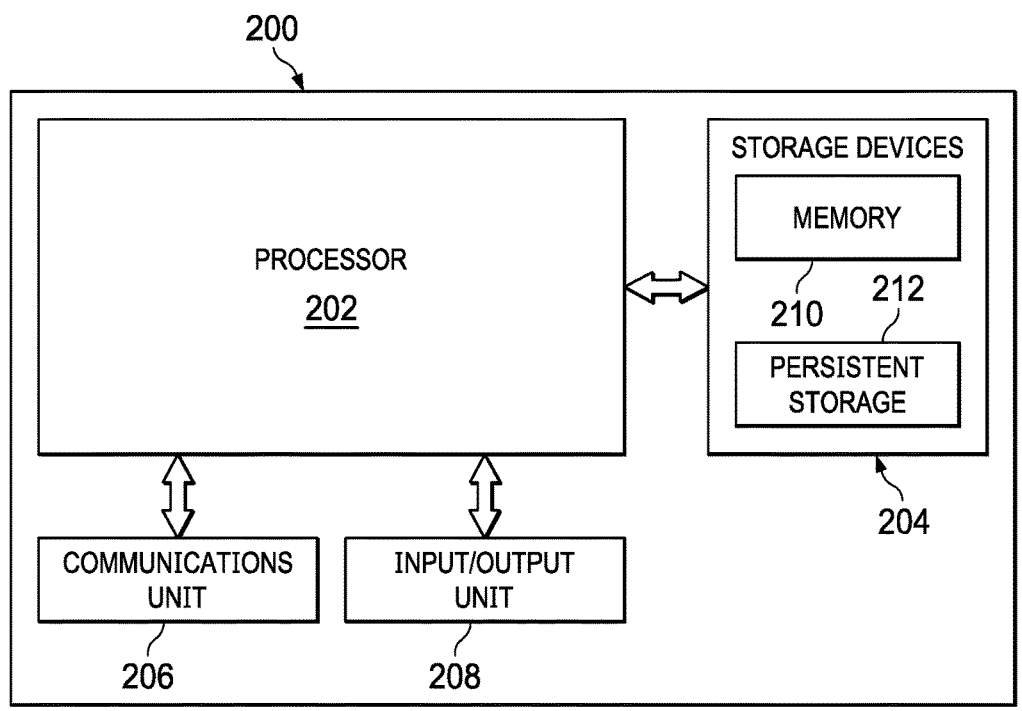
FIG. 2 illustrates example devices for user processing the operational status of devices according to this disclosure.

FIG. 2 illustrates example devices for user processing the operational status of devices according to this disclosure. In particular, FIG. 2 illustrates an example computing device 200. In some embodiments, the computing device 200 could denote an operator station, server, a remote server or device, or a mobile device. The computing device 200 could be used to run applications. The computing device 200 could be used to perform one or more functions, such as monitoring vibrations of a gas pressure regulator, generating and transmitting a notification based on the operational status of a gas pressure regulator, or recording and transmitting the vibrations associated with a gas pressure regulator. For ease of explanation, the computing device 200 is described as being used in the system 100 of FIG. 1, although the device could be used in any other suitable system (whether or not related to industrial process control and automation).

As shown in FIG. 2, the computing device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) configured to store and facilitate retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read-only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Figure 3A:
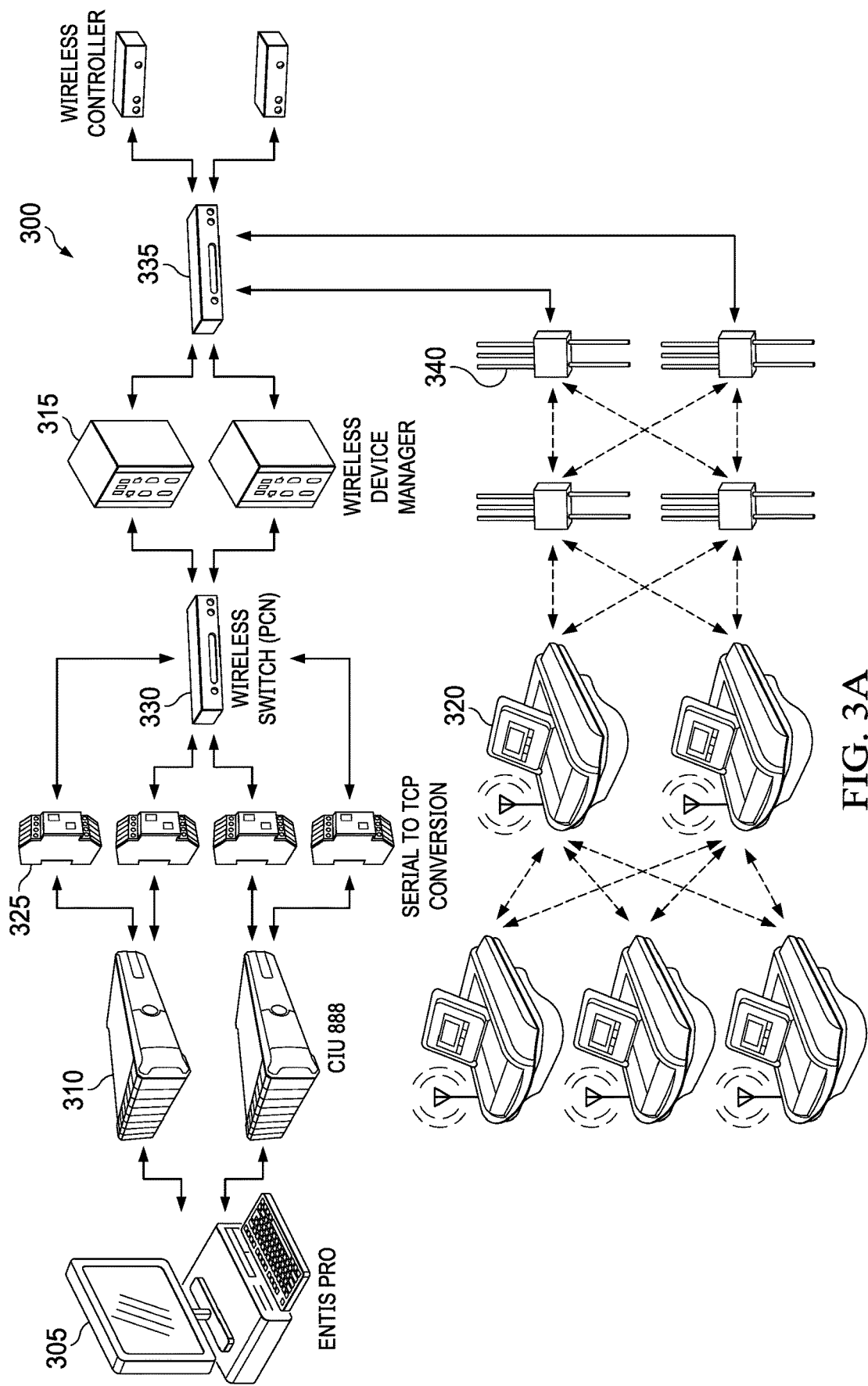
FIG. 3A illustrates an example tank farm architecture with a tank farm gateway control interface unit (CIU) according to this disclosure.
Figure 3B:
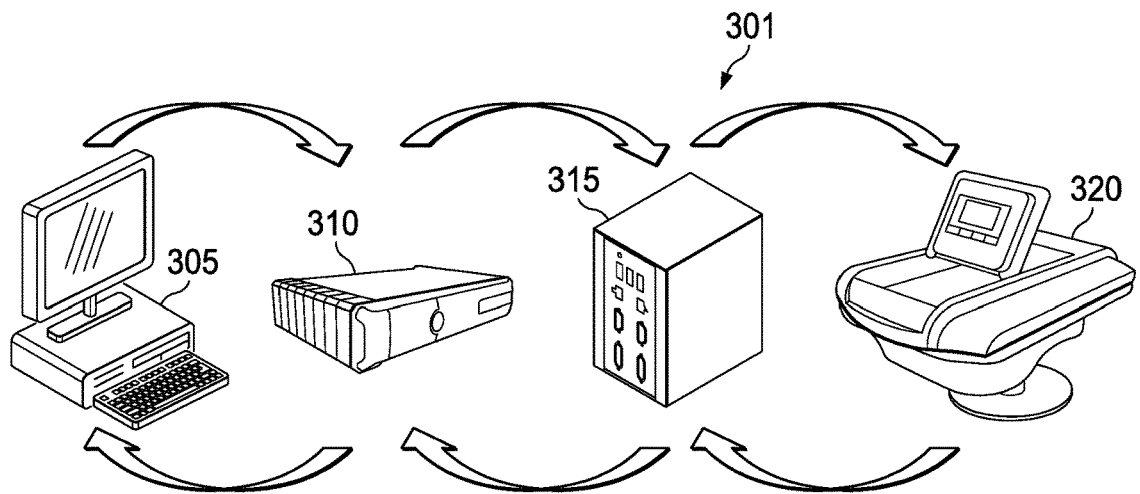
FIG. 3B illustrates an example Enraf solution according to this disclosure.

FIG. 3A illustrates an example tank farm architecture 300 with a tank farm gateway control interface unit (CIU) according to this disclosure. FIG. 3B illustrates an example Enraf solution 301 according to this disclosure. The embodiments of the tank farm architecture 300 and Enraf solution 301 illustrated in FIGS. 3A and 3B are for illustration only. FIGS. 3A and 3B do not limit the scope of this disclosure to any particular implementation.

The tank farm architecture 300 is used for monitoring inventory levels in tanks. The tank farm architecture 300 includes a tank inventory system 305, a communication interface unit 310, a wireless device manager (WDM) 315, a plurality of field devices 320, a serial to TCP conversion unit 325, a wireless switch 330, a wireless controller 335, and a wireless network 340.

Enraf Flexline radar and wireless field interface (WFI) servo gauge field devices 320 are a family of technically advanced radar level/servo gauges that interoperate with Enraf applications, such as Engauge or Entis Pro. Enraf integration allows Enraf applications to communicate with wireless FlewLine/WFI field devices over wireless networks 340, such as ISA100 wireless network.

Enraf applications run on a communication interface unit (CIU) 310, which serves as the data acquisition unit for tank measurement equipment, continuously scanning gauge data. The CIU 310 is used to calculate accurate tank inventory data according to international standardized calculation methods, such as the API, ASTM, GPA and many others.

The CIU 310 is required for both wired as well Wireless Flexline\WFI field devices. A OneWireless gateway is required for communicating with wireless devices, serves as a data acquisition unit for wireless transmitter, serves this data to CIU 310, and manages all of the wireless network. Wireless tank gauging systems or tank farm architecture 300 require extra hardware other than the CIU 310, such as a wireless device manager (WDM) 315, a serial to TCP conversion unit 325, such as Lantronix, for converting TCP to Serial and serving as bridge between WDM 315 and CIU 310. This extra hardware adds lot of cost. Also, due to limitation in number of devices under monitoring by the CIU 310, each site can require multiple CIUs 310 to support the number of wireless gauges in a tank gauging system. In this case, if both wired and wireless solutions are present, an additional cost is added since they have to install different CIU 310 for both wired and wireless solutions. A WDM 315 supports a maximum of twelve TCP clients. Since each CIU port can support thirteen wireless gauges of the field device 320, at least three CIUs 310 are required for 150 wireless gauges or field devices 320. Redundancy increases the amount of components required adding following extra costs for redundant Serial to TCP conversion unit 325, redundant switches for Lantronix, GPU cards, etc.

Integrating Enraf application with OneWireless applications involves physically connected Enraf equipment to the WDM 315, enabling the Enraf interface on the WDM 315, and configuring Enraf applications. The WDM 315 is connected to the CIU 310 through serial to TCP conversion unit 325, such as Lantronix DP-Xpress. The CIU 310 also connects to Entis Pro/Engauge applications. The WDM 315 can support multiple connections including Ethernet or serial.

The Enraf solution includes the Enraf application sending a message to the WDM 315 over CIU 310. The WDM 315 forwards the message to a field device 320, such as a wireless FlewLine/WFI. The field devices 320 processes the message and sends response to the WDM 315. The WDM 315 forwards the response to the Enraf application on the CIU 310. The CIU 310 does not communicate directly over a wireless connection.

Since a CIU 310 uses a gauge processing unit (GPU) (serial connection) protocol for communication and a WDM 315 uses TCP/UDP for communication, an extra serial to TCP/UDP (Ethernet) converter is needed between the CIU 310 field port and the WDM 315. The additional Ethernet switch 330 adds in an extra cost for each Serial to TCP conversion unit 325 (serial to TCP converter). Extra cabling is also needed for the additional Serial to TCP conversion unit 325. Converting from wired to wireless also adds in extra hardware WDMs 315 that manage the Wireless Gauges.

The CIU 310 serves as a data acquisition unit of tank gauging instruments, and continuously scans real-time data. All real-time measurement data is then used to calculate accurate tank inventory data using international standardized methods of calculation, such as API and ASTM among others. All measured and calculated data is instantly available for use by host applications, such as tank inventory systems, distributed control systems (DCSs), and programmable logic controllers (PLCs).

The WDM 315 provides for designing, commissioning, configuring, and monitoring a wireless network 340 and associated wireless field devices 320 from a centralized location. The WDM 315 acts as a network gateway enabling third-party applications (Enraf, Modbus, OPC, DCS, etc.) to communicate with wireless field devices 320.

Figure 4A:
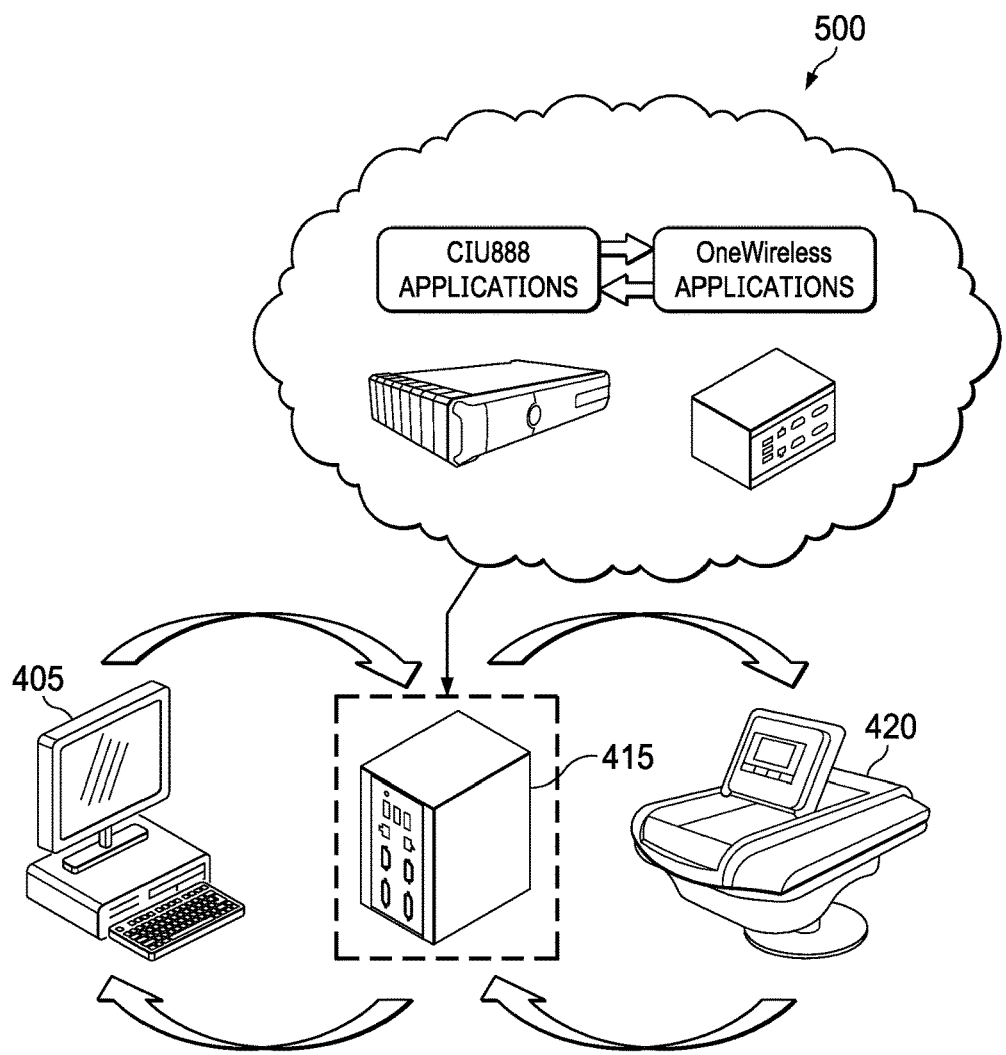
FIG. 4A illustrates an example WDM hardware incorporating a CIU application and an Enraf/CIU interface application according to this disclosure.
Figure 4B:
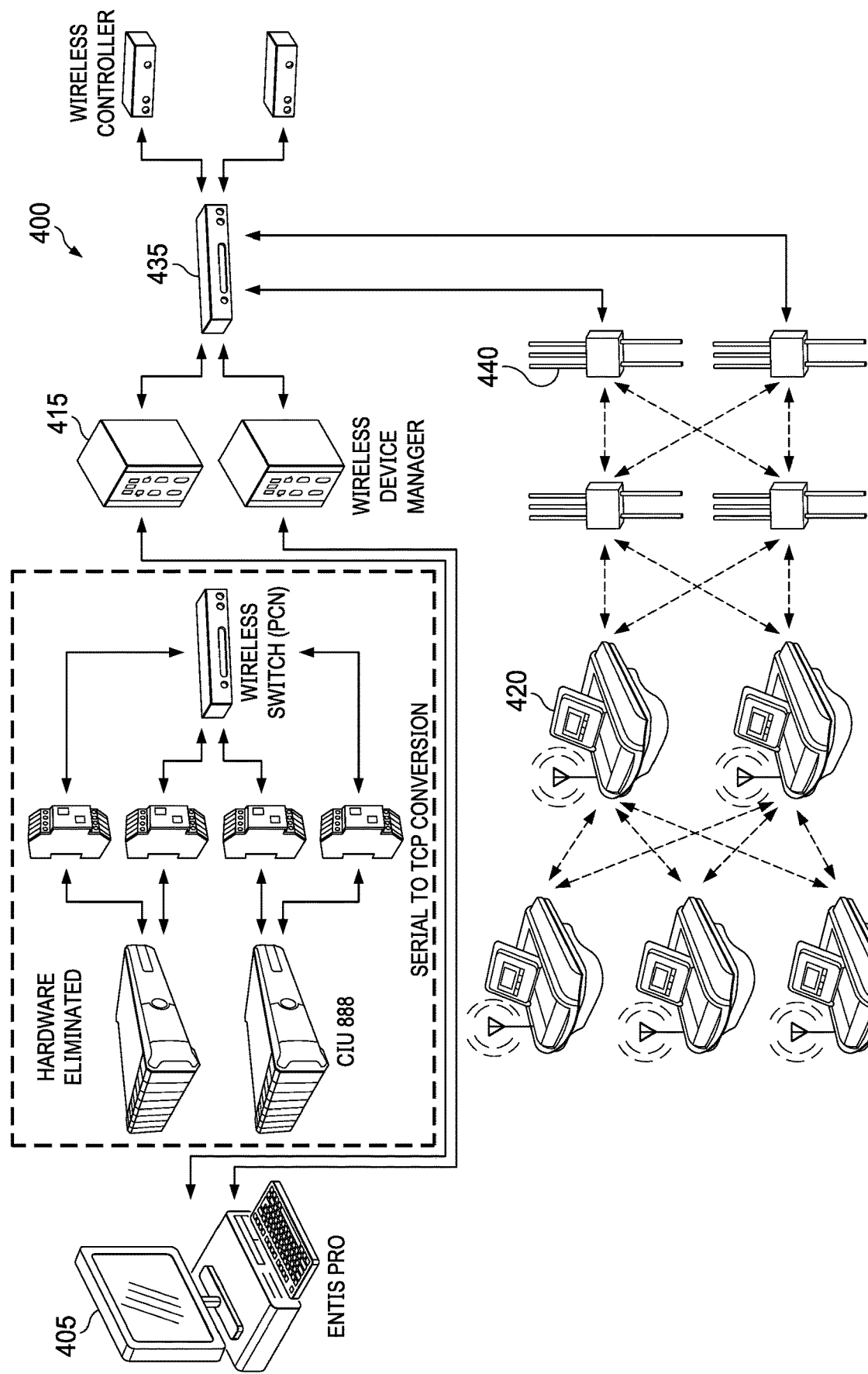
FIG. 4B illustrates an example tank farm architecture with a WDM hardware incorporating a CIU application and an Enraf/CIU interface application according to this disclosure.

FIG. 4A illustrates an example WDM hardware 401 incorporating a CIU application and an Enraf/CIU interface application according to this disclosure. FIG. 4B illustrates an example tank farm architecture 400 with a WDM hardware incorporating a CIU application and an Enraf/CIU interface application according to this disclosure. The embodiments of the WDM hardware 401 and tank farm architecture 400 illustrated in FIGS. 4A and 4B are for illustration only. FIGS. 4A and 4B do not limit the scope of this disclosure to any particular implementation.

The tank farm architecture 400 is used for monitoring inventory levels in tanks. The tank farm architecture 400 includes a tank inventory system 405, a wireless device manager (WDM) 415, a plurality of field devices 420, a wireless controller 435, and a wireless network 440.

The CIU applications are ported in the WDM 415 in such a manner that the CIU applications can communicate with the Enraf/CIU interface onewireless application on the WDM 415 through soft ports. The 12 software ports of the WDM 415 can be divided between CIU applications and onewireless applications and the gauges can be configured under each port. No extra hardware like CIU 310 is needed. With this solution, the CIUs 310, serial-to-Ethernet Lantronix convertors, and possible Ethernet switches can all be eliminated or removed. Since both WDM 415 and the CIU applications run in a single WDM 415, the extra Serial to TCP conversion unit 325 and associated cabling are not required. The combination WDM 415 reduces four Serial to TCP conversion unit 325 per CIU 310. The number of switches 330 are also reduced because Serial to TCP conversion unit 325 is not required. WDM directly communicates to the tank inventory system over the Ethernet. WDM applications provide easy integration with Experion, Modbus etc. The Onewireless CIU solution can support at least 150 wireless gauges and increase the capacity by 250%.

Figure 5A:
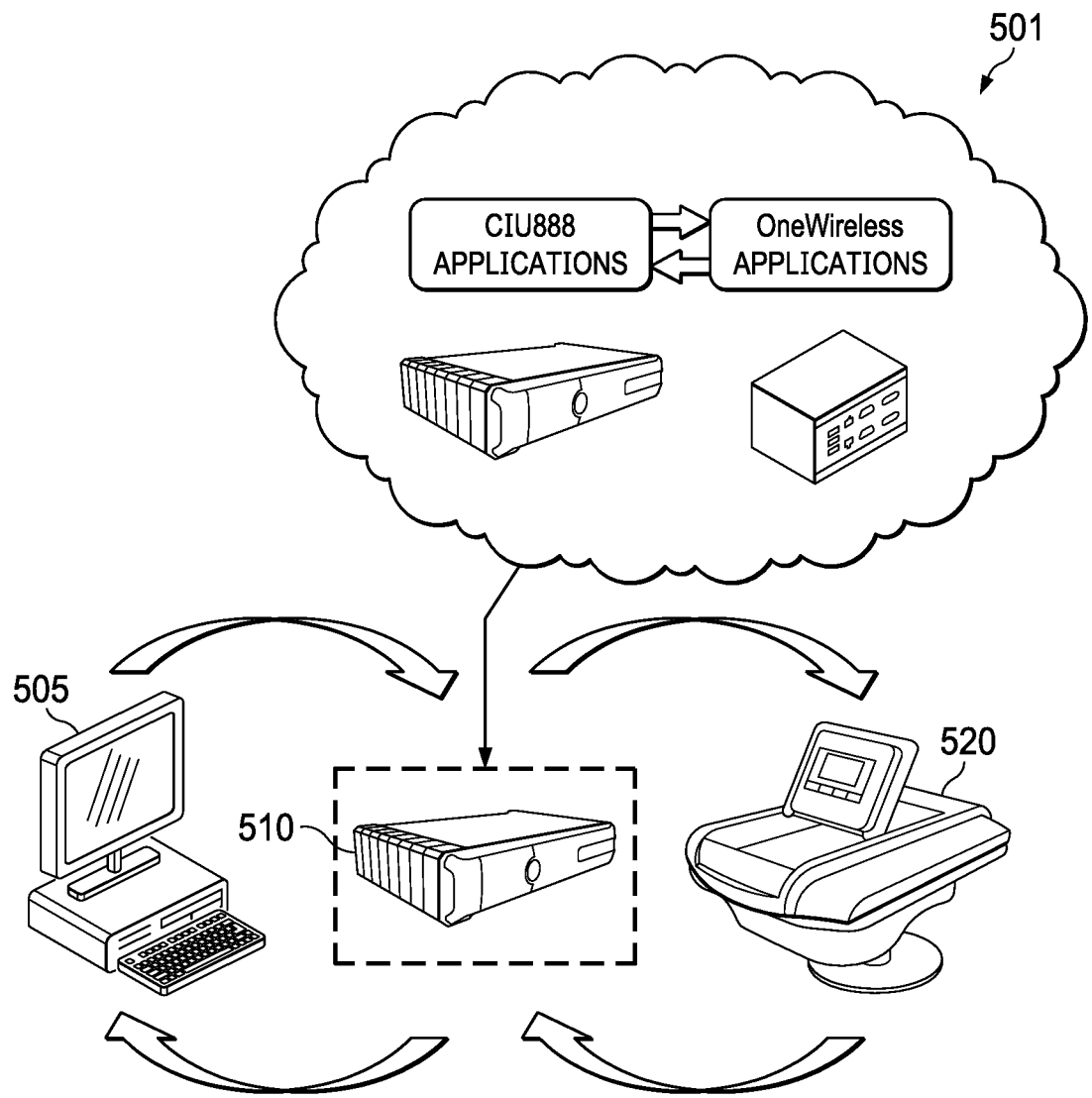
FIG. 5A illustrates an example CIU hardware incorporating a CIU application and wireless applications according to this disclosure.
Figure 5B:
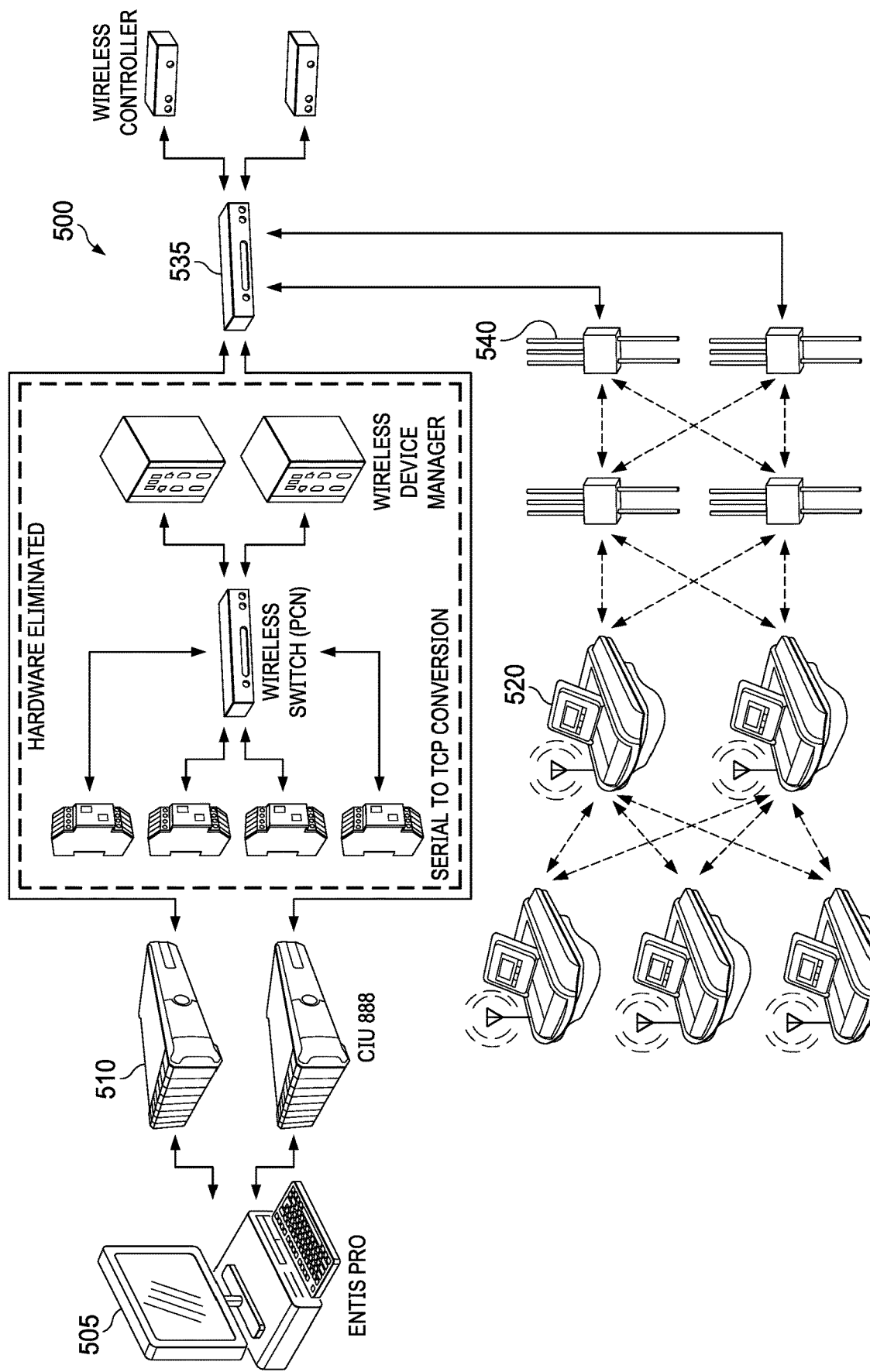
FIG. 5B illustrates an example tank farm architecture with a CIU hardware incorporating a CIU application and one-wireless applications according to this disclosure.

FIG. 5A illustrates an example CIU hardware 501 incorporating a CIU application and onewireless applications according to this disclosure. FIG. 5B illustrates an example tank farm architecture 500 with a CIU hardware incorporating a CIU application and onewireless applications according to this disclosure. The embodiments of the CIU hardware 501 and tank farm architecture 500 illustrated in FIGS. 5A and 5B are for illustration only. FIGS. 5A and 5B do not limit the scope of this disclosure to any particular implementation.

The tank farm architecture 500 is used for monitoring inventory levels in tanks. The tank farm architecture 500 includes a tank inventory system 505, a communication interface unit 510, a plurality of field devices 520, a wireless controller 535, and a wireless network 540.

The Onewireless Applications can be ported in CIU hardware 510 in such a way that the CIU applications can communicate with the Enraf/CIU interface of a Onewireless application using software ports. The CIU hardware 510 can include 12 soft ports divided between CIU applications and Onewireless applications and the gauges can be configured under each port.

Figure 6:
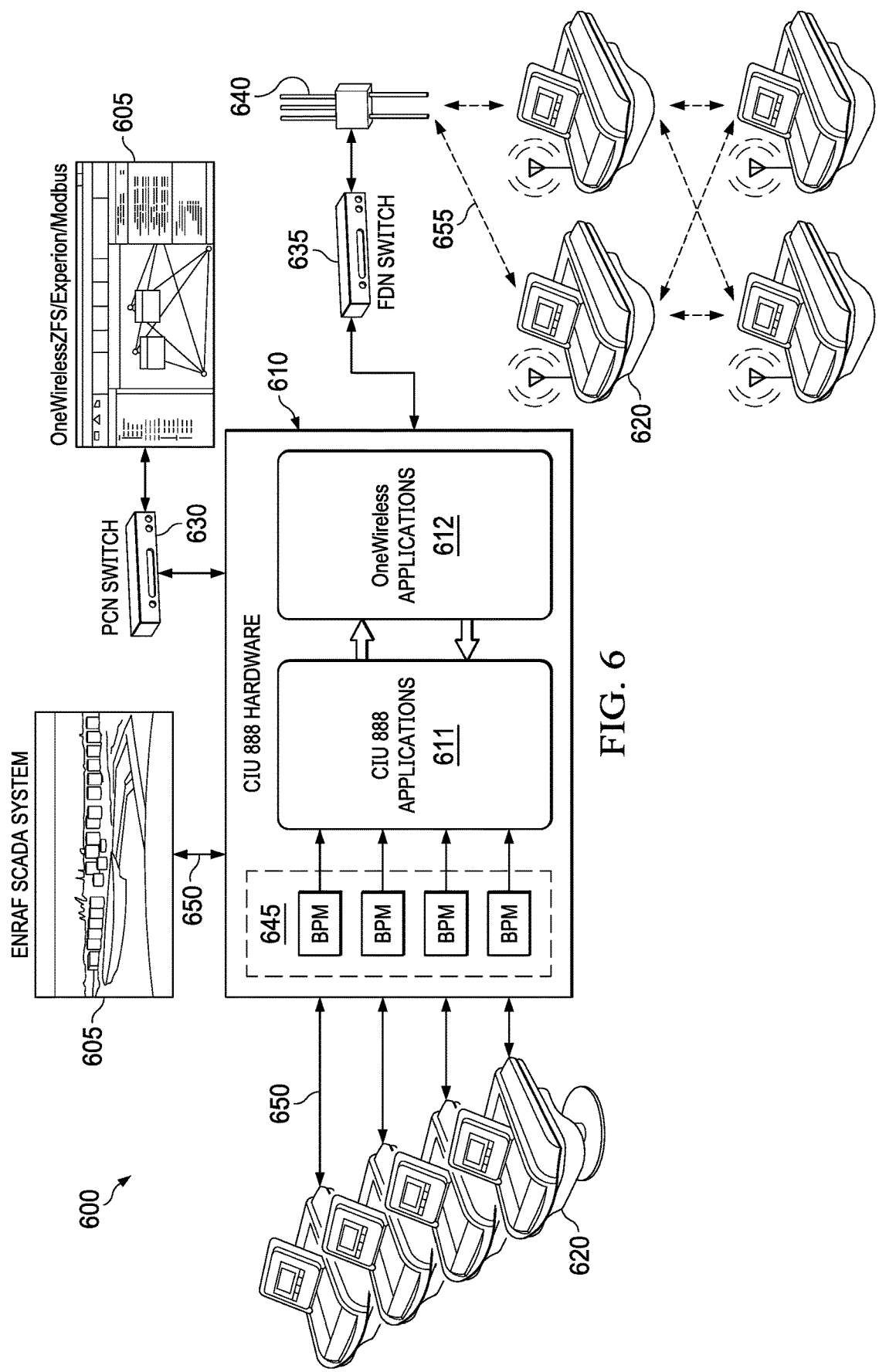
FIG. 6 illustrates a hybrid CIU hardware with wired and wireless gauge support according to this disclosure.

FIG. 6 illustrates a hybrid CIU hardware 600 with both wired and wireless gauge support on a single hardware unit according to this disclosure. The embodiments of the hybrid CIU hardware 600 illustrated in FIG. 6 is for illustration only. FIG. 6 does not limit the scope of this disclosure to any particular implementation.

The hybrid CIU hardware 600 is used for monitoring inventory levels in tanks. The hybrid CIU hardware 600 includes a tank inventory system 605, a communication interface (CIU) hardware 610, a plurality of field devices 620, a wireless controller 635, and a wireless network 640. A wireless switch 630 can also be included to communicate with different tank inventory systems 605

The wireless applications 612 can be ported in CIU hardware 610 in such a way that the CIU applications 611 can communicate over a wireless connection 655 with the Enraf/CIU interface of a Onewireless application using software ports. The CIU hardware 610 can include 12 soft ports divided between CIU applications 611 and wireless applications 612 and the gauges or field devices 620 can be configured under each soft port. The GPU/BPM cards 645 on the CIU hardware 610 can be also used for wired communication 650 with wired gauges as well as the tank inventory systems 605, which would provide a hybrid CIU hardware 610 with both wired and wireless communication with gauges or field devices 620.

The hybrid CIU hardware 610 would not require extra hardware like a WDM for managing wireless networks. This way the system is reduced by two WDMs per installation. Since both WDM and CIU hardware runs in a single wireless CIU hardware, Serial to TCP conversion unit 325 and associated cabling are not required. This way the system is reduced by four Serial to TCP conversion unit 325 per CIU hardware. The number of switches is also reduced because of the reduction in required Serial to TCP conversion unit 325. Both wired and wireless tank farming are provided in a single hardware (a hybrid wireless CIU).

In case of only wireless tank farming, BPM cards are not required in the CIU hardware further reducing the system by four BPM cards and other extra hardware on CIU hardware. The WDM application provides easy integration with Experion, Modbus etc. The hybrid CIU hardware can support at least 150 wireless gauges and increases the capacity by 200%.

An option to use cached data provided by the WDM to CIU hardware is presented either through soft ports or Modbus communication. This option would allow the hybrid CIU hardware to support more wireless Enraf gauges.

Figure 7:
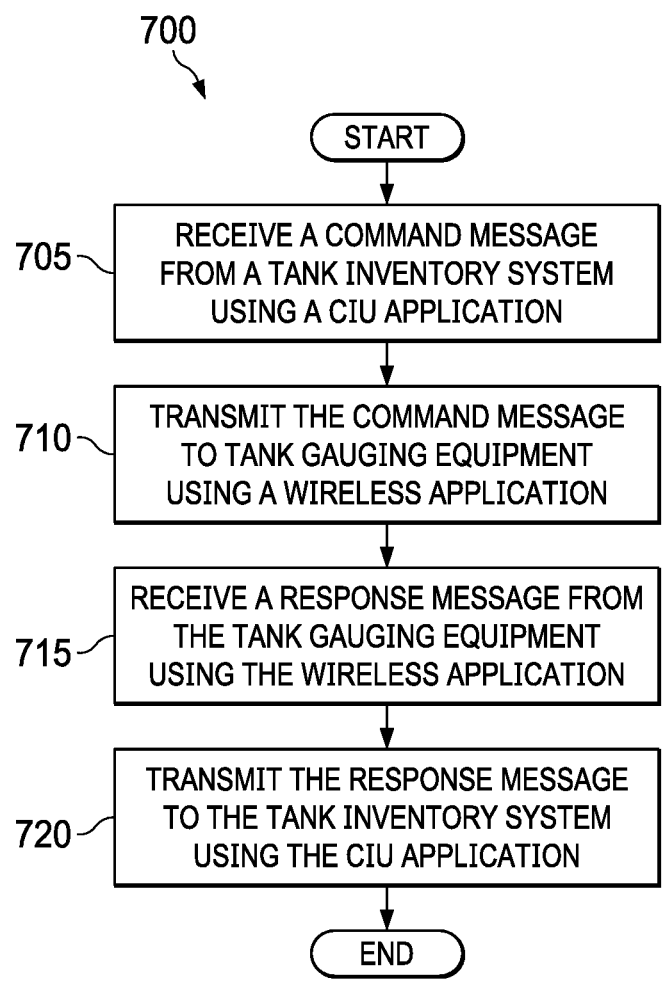
FIG. 7 illustrates an example method for wired and wireless tank gauging systems on a flexible common gateway hardware according to this disclosure.

FIG. 7 illustrates an example method for wired and wireless tank gauging systems on a flexible common gateway hardware according to this disclosure. For example, the process depicted in FIG. 7 may be performed in conjunction with the WDM hardware 415 in FIG. 4, the CIU hardware 510 in FIG. 5, and the CIU hardware 610 in FIG. 6.

In operation 705, the hardware device receives, via a serial connection, a command message from a tank inventory system using a CIU application. The hardware device communicates using a control application with a tank inventory system that operates over a serial connection. The CIU application 611 communicates with the tank inventory system 605. The CIU application aggregates the data from the field device 620.

In operation 710, the hardware device transmits, via an Ethernet connection, the command message to tank gauging equipment using a wireless application. The hardware device communicates using a wireless application 612 with tank gauging equipment that operates over an Ethernet connection. The wireless application 612 operates with the CIU application 611 to translate the data received from the field device 620 to information used by the tank inventory system 605. The Ethernet connection can includes a plurality of Ethernet connections configured to communicate with the tank gauging equipment using the wireless application. Each of the Ethernet connections can include a software port. Each software port can allow communication between the CIU application and the wireless application. The tank gauging equipment can be divided among the software ports.

In certain embodiment, the serial connection can include a plurality of serial connections. The CIU application determines whether a request is to be transmitted to a wired tank gauging equipment or a wireless tank gauging equipment. A number of the plurality of serial connections can be used to communicate with wired tank gauging equipment in parallel with communication of wireless tank gauging equipment using the CIU application. The CIU application communicates with the wired tank gauging equipment over the serial connections or the wireless tank gauging equipment over the Ethernet connections.

In operation 715, the hardware device receives, using the Ethernet connection, a response message from the tank gauging equipment using the wireless application.

In operation 720, the hardware device transmits, using the serial connection, the response message to the tank inventory system using the CIU application.

Although FIG. 7 illustrates one example of a method 700 for wired and wireless tank gauging systems on a flexible common gateway hardware, various changes may be made to FIG. 7. For example, various steps shown in FIG. 7 could overlap, occur in parallel, occur in a different order, or occur any number of times.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A communication interface (CIU) apparatus in a tank gauging system, the CIU apparatus comprising:
 a serial connection configured to communicate with a tank inventory system;
 a memory configured to store a CIU application and a wireless application consisting of:
  a wireless gateway and a wireless device manager that communicates with and collects data from a wireless tank gauging equipment via wireless access points; and
  a wired tank gauge communication protocol that communicates with and collects data from a wired tank gauging equipment over the serial connection;
 a plurality of Ethernet connections each Ethernet connection configured to connect to a switch to wirelessly communicate with tank gauging equipment using the wireless application and each of the plurality of Ethernet connections including a software port, each software port configured to communicate between the CIU application and the wireless application, wherein each software port includes connections for CIU applications and wireless applications, and the wired tank gauging equipment can be configured under each software port; and
 a processor coupled to the memory, serial connection and the Ethernet connection, the processor configured to:
  receive, via the serial connection, a command message from the tank inventory system using the CIU application,
  transmit, via the Ethernet connection, the command message to the tank gauging equipment using the wireless application,
  receive, via the Ethernet connection, a response message from the tank gauging equipment using the wireless application,
  transmit, using the serial connection, the response message to the tank inventory system using the CIU application; and
 wherein the serial connection includes a plurality of serial connections used to communicate with wired tank gauging equipment in parallel with communication of wireless tank gauging equipment using the CIU application.

2. The CIU apparatus of claim 1, wherein the tank gauging equipment is divided among the software ports.

3. A tank gauging system comprising:
 a tank inventory system configured to monitor an inventory in a tank;
 a tank gauging equipment configured to measure a level of the inventory in the tank; and
 a communication interface (CIU) apparatus comprising of:
  a serial connection configured to communicate with the tank inventory system;
  a memory configured to store a CIU application and a wireless application consisting of:
   a wireless gateway and a wireless device manager that communicates with and collects data from a wireless tank gauging equipment via wireless access points; and
   a wired tank gauge communication protocol that communicates with and collects data from a wired tank gauging equipment over the serial connection;
  a plurality of Ethernet connections each Ethernet connection configured to connect to a switch to wirelessly communicate with the tank gauging equipment using the wireless application, each of the plurality of Ethernet connections including a software port, and each software port configured to communicate between the CIU application and the wireless application, wherein each software port includes connections for CIU applications and wireless applications, and the wired tank gauging equipment can be configured under each software port; and
  a processor coupled to the memory, serial connection and the Ethernet connection, the processor configured to:
   receive, via the serial connection, a command message from the tank inventory system using the CIU application,
   transmit, via the Ethernet connection, the command message to the tank gauging equipment using the wireless application,
   receive, via the Ethernet connection, a response message from the tank gauging equipment using the wireless application,
   transmit, using the serial connection, the response message to the tank inventory system using the CIU application, and
  wherein the serial connection includes a plurality of serial connections used to communicate with wired tank gauging equipment in parallel with communication of wireless tank gauging equipment using the CIU application.

4. The tank gauging system of claim 3, wherein the tank gauging equipment is divided among the software ports.

5. A method of a communication interface (CIU) apparatus in a tank gauging system comprising:
receiving, via a serial connection, a command message from a tank inventory system using a CIU application stored in a memory consisting of:
a wireless gateway and a wireless device manager that communicates with and collects data from a wireless tank gauging equipment via wireless access points; and
a wired tank gauge communication protocol that communicates with and collects data from a wired tank gauging equipment over the serial connection;
transmitting, via a plurality of Ethernet connections, the command message to tank gauging equipment using a wireless application, each of the plurality of Ethernet connections including a software port, and each software port configured to communicate between the CIU application and the wireless application, wherein each software port includes connections for CIU applications and wireless applications, and the wired tank gauging equipment can be configured under each software port;
receiving, via one or more of the plurality of Ethernet connections, a response message from the tank gauging equipment using the wireless application;
transmitting, using the serial connection, the response message to the tank inventory system using the CIU application; and
wherein the serial connection includes a plurality of serial connections used to communicate with wired tank gauging equipment in parallel with communication of wireless tank gauging equipment using the CIU application.

* * * * *